United States Patent Office

3,486,486
Patented Dec. 30, 1969

3,486,486
METHOD OF GROWING OYSTERS
George H. Vanderborgh, Jr., Sayville, and Phillip J. Campbell, Huntington Station, N.Y., assignors to Long Island Oyster Farms, Inc., New York, N.Y., a corporation of New York
Filed Aug. 30, 1968, Ser. No. 756,522
Int. Cl. A01k 61/00
U.S. Cl. 119—4                 4 Claims

ABSTRACT OF THE DISCLOSURE

A method of growing seed mollusks, especially seed oysters, by causing the mollusk larvae to set on particles of cultch material, preferably one set larvae for particle, and growing the set larvae to the desired size under controlled condition. The cultch particles are substantially larger than the larvae but are not larger than about 600 microns maximum diameter.

---

This invention relates to the mass production of bivalve mollusks; more particularly the invention relates to the growing of seed mollusks, especially seed oysters under controlled hatchery conditions.

The growing of seed mollusks on a commercial or mass production scale has not changed significantly since 1920 to 1925, when methods and procedures for the mass artificial propagation of mollusks were first described by W. F. Wells in his annual report to the New York State Conservation Department. The more recent techniques or advances are described by V. L. Loosanoff and H. C. Davis, in "Advances in Marine Biology," vol. 1, pp. 1–136 (1963).

In the growing of seed oysters in hatcheries, the oyster larvae are allowed to set on cultch material, usually oyster shells, under controlled conditions of temperature and freedom from harmful pests and contaminants. The young oysters are then allowed to grow under the most favorable conditions for one to three months, or until they are ¼" to ½" in diameter. The seed oysters are then transferred to natural oyster grounds, especially in Long Island Sound and other New England locations. The number of oyster seeds on each oyster shell will vary considerably depending upon how heavy the set is, but in many instances there will be crowding, so that the growth of the oysters will be hampered. Such overcrowding thus may result in a high mortality of oysters and in production of large numbers of undersized, or runt, oysters, that have little value until they are separated and returned to the oyster bed for further growing. Also, at harvest time, the removal of the oysters from the oyster shell cultch results in damage to a large number of oysters and this reduces the yield of commercially usable oysters and, therefore, an increased cost for the production of the oysters.

In view of the above there has been a great need for a more practical method for the mass production of seed mollusks, especially oyster seed. It is therefore a major object of this invention to provide an efficient method for the mass production of seed mollusks by a single seed technique, especially single seed oysters. Other objects of the invention will be apparent from the description of the invention which follows.

The attainment of the objects of our invention is made possible by our discovery that individual oyster larvae can be set on particulate cultch materials and can be grown to the desired size without the necessity of removing the juvenile oysters. Preferably the size of the cultch particles will be from about 100 microns in diameter up to about 3000 microns. Thus, our single oyster technique results in the production of individual young oysters that are attached to particulate cultch material. A great advantage in the use of particulate cultch in accordance with the invention is that it facilitates cleaning of the cultch to rid it of contaminants that could be harmful to the young oysters. Also, the use of a particulate cultch eliminates the necessity of having to separate a large number of oysters from a shell cultch material. The oyster seed produced by our single oyster technique can be graded as to size, as will be hereinafter explained, so that there will be more uniformity in size of the seeds when they are ready for transfer to the ocean growing areas.

The particulate cultch is made from conventional cultch materials such as oyster shells, or limestone. A particularly desirable cultch for use in our invention is particulate oyster shells in which the particle size is larger than the larvae size and within the range of 100 to 3000 microns. The cultch may be placed in a larvae setting tank to which setting size larvae are added and when the larvae have set thereon, ideally no more than one larvae per particle, the particles are separated, e.g. by screening to separate the unset larvae from the particulate material containing the set larvae. The unset larvae are returned to a setting tank while the set larvae on the particulate material is transferred to a screened rack suspended in nutrient media for growing the set larvae to young oysters. As the young oysters grow they become larger than the particulate cultch on which they have been set and can be graded as to size from time to time by screening through progressively larger screens. The use of screened racks for growing the young oysters has the advantage that it provides a means for circulating nutrient media and at the same time provides a means for removing wastes and contaminants from the oyster growing environment. The screened racks used in the present invention are similar to those used in the invention described and claimed in our copending application, Ser. No. 720,999, filed Apr. 12, 1968.

Although screens made of various materials can be used, we prefer a screen made of monofilament synthetic polymer fibers such as nylon.

The invention may be more readily understood by referring to the drawings wherein.

Figure 1:
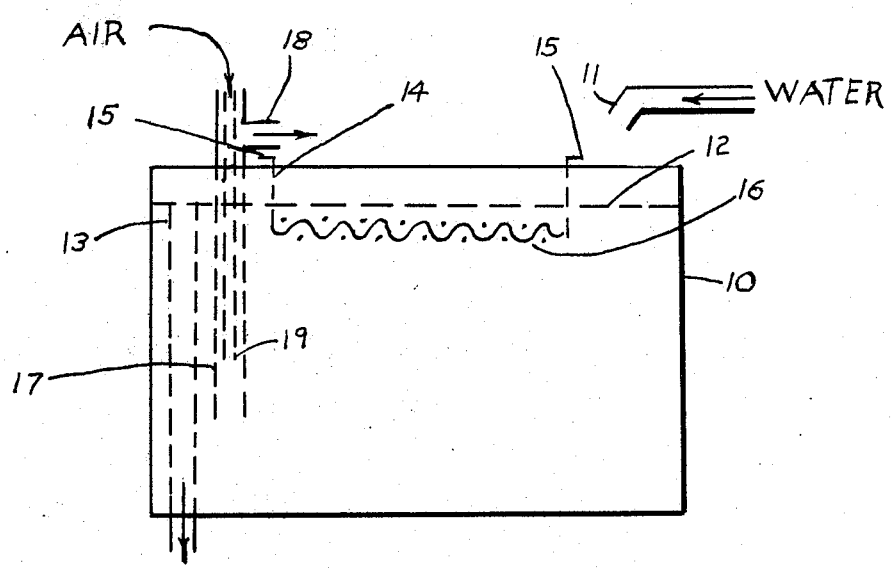
FIG. 1 represents a tank and suitable arrangement of equipment for growing oyster seed in accordance with the invention.

In FIGURE 1, 10 represents a suitable tank, e.g., a 5' x 10' x 2' fiber glass tank, that is continuously supplied with centrifuged sea water at 11. The water is supplemented with food of desirable quality for oyster propagation and maintained at a level 12 by an overflow outlet 13 about two inches below the top of the tank. A rack 14 is set into the tank and may be supported in position by hangers 15. The bottom 22 of rack 14 is covered with 80 mesh nylon monofilament screen 16. The top of rack 14 extends above the water level 12. Water from the tank is continuously circulated through the rack by a pump which may consist of a tube 17 which is open at both ends and has an outlet 18. Air is forced into tube from air line 19 which extends down into the larger tube 17. Air is forced into the tube at such a rate that water is forced to flow out of outlet 18 into the tray.

Figure 2:
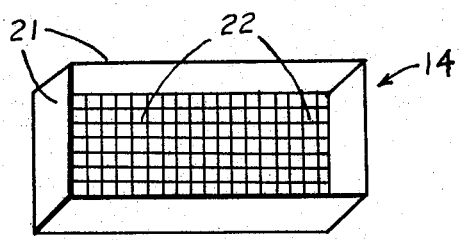
FIG. 2 represents a particular type of setting rack that is useful in the practice of the invention.

In FIGURE 2, 21 represents the sides and ends of a suitable rack as represented at 14 in FIGURE 1. The sides and ends may, for example, be 1" x 4" wood boards fastened by any suitable means at the corners. The bottom 22 is completely covered with the 80 mesh screen 16.

To illustrate a preferred embodiment of the invention, the bottom of rack 14 is covered with particulate oyster shells of 300 to 600 microns size and a desired quantity of larvae that are ready to begin setting is placed in rack 14 and centrifuged sea water containing proper nutrients is circulated therethrough. Advantageously, an effective amount of an antibiotic is added to the setting tank to inhibit harmful bacterial infection of the larvae during the setting period. After the desired amount of setting has occurred, preferably after 24 to 48 hours, or when, ideally, each particle has one larvae set thereon, and preferably before all the lravae have set, the rack is removed from the tank and the unset larvae are removed and separated from the set larvae. The unset larvae may be separated by screening, i.e. filtering through a 60 mesh screen which allows the unset larvae to pass through but retains the set larvae on the particles of oyster shell. The unset larvae are returned to setting rack 14 containing a fresh supply of particulate cultch and setting is allowed to continue for another period of 24 to 48 hours and the step of separating set from unset larvae is repeated. The set larvae which are separated are transferred to a rack having a lower mesh screen, e.g. a 40 mesh screen, and placed in a growing tank for growing the young oysters. The 40 mesh screen can be used to separate the small or runt oysters and these can be allowed to grow to a larger size on a 60 mesh screen. As the oysters continue to grow they are transferred to larger screens until they are the desired size for sale as seed oysters. The growing of the young oysters on screens of increasingly coarser mesh permits the grading of the oysters as to size so that individual seed oysters, or individual mature oysters, of more uniform size can be marketed. Use of the screens allows for more efficient use of the nutrient media and also allows for wastes to be readily removed.

The media used for growing the young oysters after separation from the cultch may be the same as used for setting the larvae. Advantageously the growing racks can be placed in the same tank with the setting rack if the tank is large enough.

Although only one type of larvae setting tank has been described and illustrated, it should be noted that other conventional setting tanks and procedures can be used. For instance the particulate cultch material can be spread on the bottom of the setting tank and the larvae may be allowed to set thereon for a period of 24 to 48 hours before separation and addition of fresh cultch particles.

While there have been described what is at present considered to be the preferred embodiments of this invention, it will be obvious to those skilled in the art that various changes and modifications may be made therein as fall within the true spirit and scope of the invention.

We claim:

1. The method of producing single seed mollusks which comprises
   (1) setting of the mollusk larvae, under larvae setting conditions, onto particulate cultch material and
   (2) growing the young mollusk to the desired seed size under controlled environment.

2. The method of producing single seed oysters as in claim 1 wherein the particulate cultch material is oyster shell of 300 to 600 micron size.

3. The method of producing single seed mollusks as in claim 2 wherein step (2) includes growing the young oysters on a screen of mesh size fine enough to retain the young oysters and with nutrient flowing through the screen.

4. The method of producing single seed oysters as in claim 3 wherein step (2) includes the use of progressively larger mesh screens that retain the young oysters of desired size but allows the wastes, contaminants and runt mollusks to filter through.

References Cited

UNITED STATES PATENTS

| | | | |
|---|---|---|---|
| 1,933,950 | 11/1933 | Wells | 119—4 |
| 3,196,833 | 7/1965 | Glancy | 119—4 |
| 3,298,354 | 1/1967 | Geer | 119—4 |

ALDRICH F. MEDBERY, Primary Examiner